Feb. 12, 1935.  A. J. CAWLEY  1,990,977

ENERGY TRANSMISSION SYSTEM

Filed July 8, 1929

INVENTOR

Aloysius J. Cawley

ATTORNEY

Patented Feb. 12, 1935

1,990,977

UNITED STATES PATENT OFFICE 1,990,977

ENERGY TRANSMISSION SYSTEM

Aloysius J. Cawley, Pittston, Pa.

Application July 8, 1929, Serial No. 376,743

12 Claims. (Cl. 250—11)

The invention relates generally to the transmission of energy by means of electromagnetic waves in such manner that very little energy is lost by radiation. More particularly it concerns the concentration of the waves into beams, which are transmitted only when the transmitting apparatus is in a position to direct those beams directly upon the receiving antennæ. The amount of energy radiated to each individual receiving station is also variable.

The objects of the invention are as follows:

Converting the electrical energy to be transmitted into electromagnetic waves which are radiated from suitable antennæ to a plurality of receiving stations in such manner that any desired amount of energy may be transmitted to any desired number of receiving stations. The amount of energy transmitted and the number of receiving stations to which it is transmitted are variable within wide limits. This is accomplished by converging those waves into a beam or beams, and radially rotating those beams at a frequency that will insure a constant supply of energy to each of the receiving stations. The more beams there are, the less number of revolutions per minute is necessary.

The receiving stations are provided with means for converging the beam upon the antenna, so that very little energy passes the receiving station, all of it being intercepted, and that concentration of energy upon the antenna is prolonged.

The immense loss due to radiation in all systems heretofore proposed of transmitting energy by electromagnetic waves is enormously reduced and almost entirely eliminated by equipping the transmitting station with an interrupting or commutating element so that a beam is projected upon a receiving station only, and never into free space.

An electrical filtering device is also provided at the transmitting station which permits any desired amount of energy being radiated to each individual station independent of the others.

Figure 1:
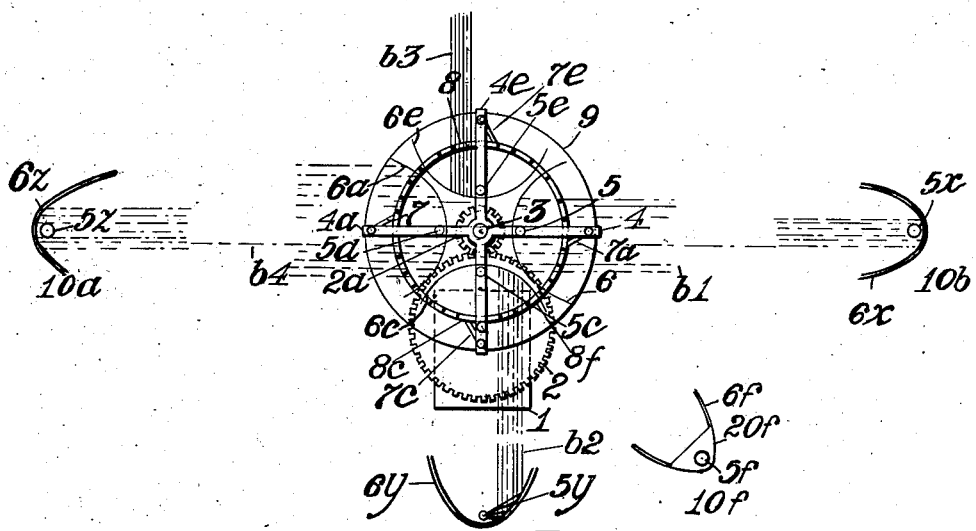

Reference is to be had to the accompanying drawing forming a part of this specification, in which like characters of reference denote corresponding parts in all of the views, and in which, Figure 1 is a plan view of the transmission system, showing the central station sending out several beams of electric waves to a few receiving stations. One station is shown not receiving any energy, due to the fact that no beam transmitter is in position to send a beam to it. It will be noted that beams are projected only to receiving stations, none being projected into free space, and thus there is a tremendous saving of energy over all other proposed systems.

Figure 2:
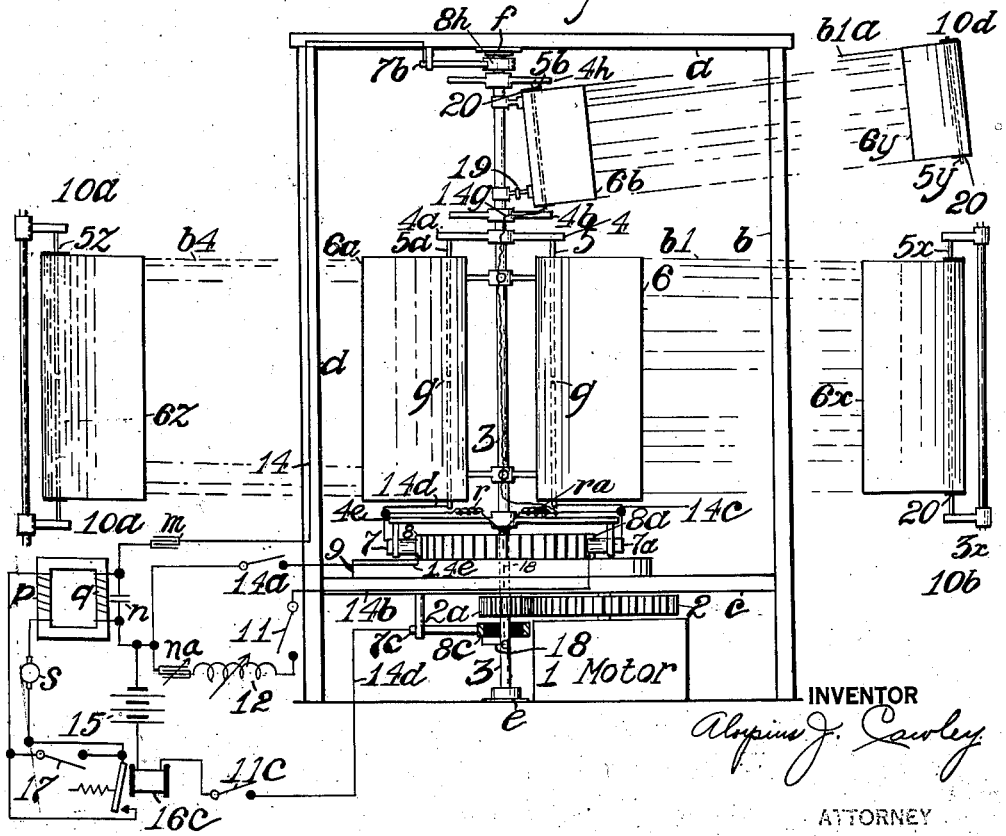

Figure 2 is an elevational view of a transmitting system, showing also beams being transmitted to a few receiving stations, two of which are in the same vertical plane, but different horizontal planes, illustrating the fact that stations in the same radial line may receive their specified quota of energy independently of each other. The electrical means for periodically interrupting the transmission of the various beams, so that a beam is only transmitted to a receiving station and never to free space, is illustrated. The electrical filtering apparatus is also illustrated in the figure whereby each and every receiving station receives an amount of energy which may be varied within wide limits entirely independent of the other receiving stations.

The general plan of the power transmission system is illustrated in Figure 1, a more detailed description being given with Figure 2. In Figure 1 is illustrated a view of the apparatus which is comparable to an instantaneous photograph showing the position of the different parts and the radiated beams at the instant that the four transmitting concentrators are in a position to send beams to the four receiving stations. It is to be understood, however, that the various antennæ and concentrators are rapidly rotating, and that a beam traverses the full width of the various receiving concentrators, such as 6f, 6x, 6z, etc. Any means may be used of supplying the various antennæ with radiofrequency current.

The general plan of the power transmission system is illustrated in Fig. 1, and a more detailed description is given with and shown in Figure 2. Electric, gasoline or other motor 1 causes wheel 2 to rotate, which in turn causes wheel 2a, which is rigidly attached to shaft 3, to rotate. Starting the motor causes shaft 3 to rotate. Rigidly attached to shaft 3 are the supports 4, 4a, 4e, etc., which carry antennæ 5, 5a, 5c, etc. Those vertical antennæ, therefore, rotate with shaft 3. Supports 4, etc., also carry parabolic reflectors 6, 6a, 6c and 6e, which act to concentrate the electromagnetic waves emitted by the antennæ into radial beams, such as b1, b2, etc. As the antennæ 5, 5a, 5c, etc., are of the vertical rod type, there will be virtually no radiation directly upward in the direction of the antennæ, for that reason, parabolic reflectors are illustrated rather than paraboloid or spherical reflectors. However, the invention is not limited to any particular type of reflector. It will be readily seen that when the antennæ 5, etc., are supplied with power and motor 1 is started a series of radial beams of electromagnetic waves is sent out, which rotates in a manner similar to that of the spokes in a wheel. The manner of supplying the antennæ with power is illustrated in Figure 2. Various receiving stations, such as 10b are illustrated. The radial beams impinge upon the parabolic wave concentrators, such as 6x, 6y, 6z, which may cover a rather large arc of a circle, in order that the energy of the beam may be concentrated upon the antennæ for a considerable time before and after the beam actually comes in contact with the antennæ. The electrical apparatus of the receiving station is not illustrated, as it may be of any type desired and the invention is not limited thereto. Similarly the electrical apparatus for generating the radio frequency current in the transmitting station is not limited to the type shown, as any type may be used, as the invention is not concerned with any particular method of generating a high frequency current, but is concerned with the transmission of energy by means of electromagnetic waves. In order to obviate the waste of energy radiated from the transmission station when the various beams are not in contact with the receiving station concentrators, such as 6x, apparatus is provided whereby energy is radiated only when the beams are in actual contact with the receiving concentrators. In other words, a radiated beam is sent out only when the transmitting concentrator is in a position to send a beam directly in contact with the receiving concentrator, such as 6x. At all other times, no energy is sent out. Therefore, when the transmitting station is in operation, the system represents a huge wheel the spokes of which are the radiated beams, each going to its respective receiving station, and no energy is wasted by being radiated into free space beyond the receiving stations. The receiving stations may be many thousands in number. Thus, by rotating one or more antennæ, the equivalent of thousands of antennæ, each pointing in a specific direction is obtained, and the large expense of constructing such is saved. In this connection, it will be seen that short waves are very desirable, even those of a centimeter or so in length, although it is not desired to limit the invention to any wave length. Short waves are more easily reflected by the parabolic concentrators, and the shorter the wave the smaller the parabolic concentrator, resulting in greater ease of rotation and economy of construction.

It is to be noted that Figure 1 merely illustrates the position of the antennæ at a very small fraction of a second. As the antennæ are rotated at a considerable speed, all of the receiving stations receive their beams in a small fraction of a second, and an illustration of the antennæ in motion would show each station receiving its beam, the whole resembling a huge stationary wheel, whose spokes are the radial beams. By means of apparatus to be described later in this specification, the emission of beams to the various stations is controlled, so that only those desired may receive energy.

If a speed of fifteen revolutions per second is adopted with a transmitter having four beam transmitters, it is obvious that each receiving station will receive a radial impulse having a frequency of sixty impulses per second, which will be the equivalent of the sixty cycle alternating current now in commercial use.

Since a large area of transmission is to be covered, many hundreds of stations may receive their corresponding beams, although the actual number of antennæ may be only four or less—even only one. The greater the number of transmitting antennæ, the slower the speed of rotation, and vice versa. The rotating element of the transmitter may be only a foot or so in diameter when real short waves are used, and it is obvious that a slight turn of it will cause the beam to cover a large arc of a circle at a distance of say ten miles. It is, therefore, obvious that many thousands of stations may be supplied in several planes, thus entailing an immense saving in wiring over the present system of transmitting power. It is well known that short waves are best for short distances of transmission, and that long waves are used more for distance penetration.

All of the details of the apparatus are shown in Figure 2. Vertical shaft 3 is supported in journals $e$ and $f$, which in turn are supported by frame $a$, $b$, $c$, made of insulating material such as thoroughly seasoned and shellacked wood. This forms a cage-like support, all of which is not illustrated, some of it being in the plane towards the reader. As described, shaft 3 produces the rotation of the various antennæ such as 5, 5a, 5b, which are attached to it by the electrically conducting arms 4, 4a, etc. The corresponding reflectors 6, 6a and 6b are also supported on those arms. The manner of rotating the shaft by motor 1 has already been described in connection with Figure 1. It is also here illustrated. The arms 4b 4e, etc., are electrically nonconducting and carry the brushes 7 and 7a, which make contact with the commutator segments 8 and 8a.

On support $c$, which also has one or more similar supports in different planes to form a cage, is mounted the base 9, which in turn has mounted upon it the stationary commutator composed of many segments such as 8 and 8a, which make contact with brushes 7 and 7a. It will now be seen that when motor 1 is operated, the antennæ 5, etc., and reflectors 6, etc., are rapidly rotated with shaft 3.

Any form of high frequency energy may be supplied. The means of generating high frequency energy are many and really form no part of the invention. The energy to be transmitted is here shown as being generated by a source of power such as generator $s$. When switch 17 is closed, energy is supplied directly to the primary $p$ of the transformer, which in turn generates high frequency and high voltage in transformer secondary $q$. This latter energy is supplied to the condenser $n$ which causes the energy to be converted into radiofrequency alternating current. This current is supplied to conductor 14, which may be if desired, provided with a condenser $m$ to keep out the direct current from battery 15, to be described later.

The radiofrequency current traverses the conductor 14, brush 7b, collector ring 8h, or if desired it may be supplied directly to the journal $f$. In either event it reaches shaft 3 and upper conducting arm 4h, thence by conductor to antenna 5b. The current traversing the shaft 3 also passes to arms 4 and 4a, and to their corresponding antennæ 5 and 5a, each being shown here as containing a spark gap $g$. The lower arms, such as 4e are nonconducting, but wires such as 14j collect the current from antenna 5b and wire 14c collects current from antenna 5, and wire 14d from antenna 5a. The wires thus carry the current from the various antennæ to the brushes 7 and 7a, one for each antenna and which move directly with the antennæ. The commutator segments are stationary. Only two circuits containing the two commutator segments 8 and 8a are shown as connected by wires such as 14b and 14e in the circuit, in order not to complicate the drawing. Switches such as 14a and 11 determine whether those circuits are to be inserted or not. Segment 8 is so located that when brush 7 is in contact with it, the corresponding beam b4 formed by the parabolic reflector 6a from the electromagnetic waves generated in antenna 5a, is in contact with the concentrating parabolic reflector 6z, thus concentrating the beam energy upon antenna 5z of receiving station 10a. Therefore, radiofrequency current is permitted to traverse antenna 5a during the time that brush 7 and commutator segment 8 are in contact. Just as soon as this contact between 7 and 8 is broken, antenna 5a receives no current, and ceases to emit electromagnetic waves. The same is true of segment 8a and brush 7a, which similarly control beam b1 from antenna 5, which is inches in contact with reflector 6x and antenna 5x of station 10b. This latter segment also controls the beam from reflector 6b of antenna 5b, which sends beam b1a to station concentrator 6y and antenna 5y of station 10d.

Attention is particularly called to the phase of the system by which stations 10b and 10d, although situated in the same direction radially from the sending station, but one above the other, may be supplied simultaneously each with its own quota of current or energy, independently of the lower station. Thus stations whose antennæ are situated in the same vertical plane on the same radius, but in different horizontal planes, are independently supplied with energy.

Attention is also called to the fact that the various concentrators, such as 6x, may be very wide, thus covering a large segment of a circle, so that energy may thus be delivered to the antennæ such as 5x all during the time the beam is traversing the concentrator, whereas the antenna itself is actually touched directly only during the fraction of a second.

As stated above, any number of switches are provided, such as 14a and 11 to control the sending of the beams to the various receiving stations. If both are closed, the energy is divided equally between both circuits. In some or all circuits inductances and condensers may be provided, such as 12 of the variable type. If both switches 14a and 11 are closed and inductance 12 is included in the circuit as shown, the high inductance of the circuit controlled by 11 will cause less energy, in proportion to the variable impedance, to traverse it as compared with circuit controlled by 14a. Moreover, as 12 is variable, any amount of radio frequency current may be permitted to pass. Inductance 12 and condenser na may be connected in series or in parallel, as desired. Only two circuits are shown in order not to complicate the drawing.

From the above description, it will be noticed that as the antennæ are rotated, beams are sent out to the desired stations only while the corresponding reflector is opposite its corresponding antenna. This is illustrated also in Figure 1, where the rotating members are in such a position that the concentrators are shown sending their beams b1, b2, b3 and b4 to the four stations 10b, 10c, 10a etc. Station 10f is not receiving any energy, due to the fact that none of the concentrators is at the present instant pointed towards it.

If four beam directors are used, as shown, and the shaft 3 rotated at fifteen rotations per minute, a frequency of 60 cycles per second in each receiving station will result. However, any number of directors and any speed may be selected. Sixty cycles per second is a common commercial frequency used at present.

By the above mentioned arrangement, it will be noted that the energy supplied to the transformer primary p is constant, whether any energy is being broadcast or not. If desired, this is remedied by the method described in the next paragraph.

Switch 17 is opened, and energy from s then traverses the lever of the interrupter 16c, which acts to shut off energy from s at all times except when energy is to be broadcast. By closing switch 11c, energy passes from battery 15 through the magnet of the interrupter 16c, switch 11c, wire 14d, brush 7c, collector ring 8c, wire 18 which passes through a canal in shaft 3 and connection is made by branches from it to wires 14c and 14d, which carry the radiofrequency currents. Reactance coils r and ra permit the passage of the direct current from battery 15, but prevent the passage of the high frequency current to any antenna whose brush is not on a properly excited commutator segment. It will be thus seen that no energy from the dynamo passes to the coil p except when a beam radiator or radiators are in proper position for the broadcasting of energy. The circuit of dynamo s is broken at all times except when energy passes from the battery through 16c which closes its switch lever, and at all other times this lever is pulled away from its contact, and no energy flows from dynamo s.

Reflector 6b is shown supported by insulated supports 19 to shaft 3. Those supports are provided with turnbuckles in order that the reflector may be inclined at any desired vertical angle. The heavy shaded portion at the lower part of the reflector shows that there is a strip 20 of insulating material supporting the antenna 5b. The same manner of support may be used in the other concentrators, such as 6x and 6y.

It is obvious that the different receiving stations receive their energy in the form of current of high frequency and very high electromotive force. It may be converted by means of stepdown transformers into alternating current of a much lower electromotive force and corresponding larger amperage.

Figure 2 shows that antenna 5b is situated above antenna 5, and that the latter is provided with a spark gap g. This is deemed to be sufficient illustration of a transmission apparatus consisting of a series of vertical antennæ one above the other, all being located at the focus of a parabolic reflector so that each reflector has a large number of electromagnetic wave radiating antennæ located in its focus. This is particularly intended for use with waves of very short length—even those of a few millimeters. However, it is again asserted that the apparatus is not limited to any type or magnitude of waves. In other words, the transmitter may also be described as a vertical transmitter consisting of a large vertical rod even one hundred feet or more in height which has been cut up into hundreds of small sections by a saw, so that there are many air gaps, those sections being supported by appropriate insulating supports and each being also supplied by radiofrequency current so that each may generate electromagnetic waves of a length corresponding to the size of the various sections. This plurality of vertical rods will be located in the focus of one large vertical wave concentrator, such as a parabolic reflector made of wires or metallic sheet. This will give an antenna of dimensions corresponding to those of stations now in use, but radiating a large amount of exceedingly short waves, instead of the usual long ones. If rather short waves are used, the width of the concentrator necessary is quite small, so that it is not much wider than a few diameters of the antenna. Consequently, very little energy is required to rotate the transmission apparatus, while radiating a large volume of energy, equal to that radiated by a continuous antenna of the same dimensions, but the energy in this case is in the form of short electromagnetic waves.

Having described my invention, I claim as new and desire to secure by Letters Patent:

1. An energy transmission apparatus, consisting of a plurality of vertical antennæ to radiate electromagnetic waves, a plurality of wave reflectors acting to converge the said waves from said antennæ into radial beams, means such as a motor and suitable gearing for rotating said antennæ and said wave reflectors in order that said radial beams may be circularly rotated; a plurality of peripherally located receiving stations each provided with vertical antenna and electric wave converging means, such as parabolic reflectors acting to concentrate the energy of said waves upon the said receiving antennæ, in order that said receiving stations may receive their energy in the form of alternating current; interrupting means, such as a commutator, acting to shut off the current from said plurality of transmitting antennæ during the time when said transmitting reflectors are not directed toward the said receiving station reflectors in order that no energy may be lost through radiation.

2. An energy transmission apparatus, consisting of a transmitting central station comprising a plurality of vertical antennæ which radiate electromagnetic waves, a plurality of wave concentrators coacting with each of said antennæ to concentrate said electromagnetic waves into a plurality of radial beams and rotating means such as a motor to rotate said antennæ and concentrators in order that said beams may be circularly rotated; a plurality of peripherally located receiving stations, each provided with vertical antennæ and coacting electromagnetic converging means to concentrate said beams upon said receiving station antennæ in order that alternating current may be generated therein; interrupting means, such as a commutator acting to shut off the current supplied to said transmitting antennæ during the time when said transmitting reflectors are not directed toward the said receiving station converging means in order that no energy may be lost through radiation; means such as filters acting to supply varying amounts of energy to said transmitting antennæ when said beams are directed to the different said receiving stations in order that each of said receiving stations may receive a specific quota of energy regardless of the other stations.

3. The method of transmitting energy consisting of forming a beam of electromagnetic waves, circularly rotating said beam many times per second, interrupting said beam in a predetermined manner in order that it shall describe at each revolution a plurality of desired, continuous, peripheral arcs on circles concentric with the center of rotation of said beam, and converting said waves into electric current at said peripheral arcs.

4. The method of transmitting energy consisting of forming a beam of electromagnetic waves, circularly rotating said beam many times per second, interrupting said beam in a predetermined manner in order that it shall describe at each revolution a plurality of desired, continuous, peripheral arcs on circles concentric with the center of rotation of said beam, varying the intensity of said beam as it traverses each of said peripheral arcs, the intensity of said beam being uniform for any particular arc, but different for different arcs, and converting said waves into current at said peripheral arcs.

5. An electrical energy transmission apparatus consisting of a stationary, horizontal commutator provided with a plurality of arcuate contact segments, rotatable means in cooperative relation with said commutator for forming and circularly rotating a radial beam of electromagnetic waves, said rotatable means including a contact element making successive contact with said contact segments in order to energize said beam forming beams during the intervals said contact element is in engagement with said segments, and means for converting electromagnetic waves into electric current located at points on circles concentric with said commutator, said points being radially opposite said contact segments.

6. An electrical energy transmission apparatus consisting of a stationary, horizontal commutator provided with a plurality of arcuate contact segments, a rotatable means in cooperative relation with said commutator for forming and circularly rotating a radial beam of electromagnetic waves, said rotatable means including a contact element making successive contact with said contact segments in order to energize said beam forming means during the intervals said contact element is in engagement with said segments; a plurality of reflectors occupying arcs on circles concentric with said commutator, said arcs being coextensive with and subtending said arcuate segments, said reflectors being very large relative to the width of said beam, and an antenna located at the focus of each of said reflectors in order that the engagement of said beam with said antenna shall be very much prolonged by reflection from said reflector.

7. An electrical energy transmission apparatus consisting of a stationary, circular commutator provided with a plurality of arcuate contact segments, rotatable means including a contact element in cooperative relation with said commutator for forming and circularly rotating a radial beam of electromagnetic waves, said contact element making successive contact with said segments and thus energizing said beam forming means, a source of electrical energy connected to said wave forming means and to said segments in order to energize said wave forming means only during intervals when said contact element is in engagement with said segments, and means for breaking the connections of said source of electrical energy with each of said contact segments at will in order that said radial beams will be produced only at certain selected arcs.

8. An electrical energy transmission apparatus, consisting of a stationary, horizontal circular commutator provided with a plurality of arcuate contact segments, rotatable means in cooperative relation with said commutator for forming and circularly rotating a radial beam of electromagnetic waves, said rotatable means including a contact element making successive contact with said contact segments in order to energize said beam forming means during said contact, a plurality of reflectors occupying arcs of circles concentric with said commutator, said arcs subtending and being coextensive with said segments and means for converting electromagnetic waves into electric current located at the foci of said reflectors.

9. An electrical energy transmission apparatus consisting of a stationary horizontal circular commutator provided with a plurality of arcuate contact segments, a rotatable frame in cooperative relation with said commutator, a reflector carried on said rotatable frame, said reflector being so arranged as to form and project a beam radially, an antenna carried on said frame at the focus of said reflector, a contact element carried on said rotatable frame and making successive contact with said contact segments, a source of electrical energy connected to said antenna and said contact segments to energize said antenna only while said contact element is in contact with said segment, a plurality of reflectors at various distances from and occupying arcs on circles concentric with said commutator, said arcs subtending and being coextensive with said arcuate segments, and an antenna at the focus of each of said reflectors.

10. An electrical energy transmission apparatus consisting of a stationary, circular horizontal commutator provided with a plurality of arcuate contact segments, a rotatable frame in cooperative relation with said commutator, a plurality of reflectors arranged on said frame to radially project a plurality of electromagnetic wave beams, an antenna in the focus of each of said reflectors, means for rotating said rotatable frame, a plurality of contact brushes connected one to each of said antenna carried on said rotatable frame, suitable circuits connected to said antennæ and said segments, said circuits including suitable switches for opening or closing said circuits and a source of power connected to said circuits in order that a plurality of radial beams may be projected at will to desired arcs peripheral to said commutator.

11. An electrical energy transmission apparatus consisting of a stationary circular commutator provided with a plurality of arcuate contact segments, current modulating elements in electrical connection with said segments, rotatable means including a contact element in cooperative relation with said commutator for forming and circularly rotating a radial beam of electromagnetic waves, said contact element making successive contact with said segments and thus energizing said beam forming means, a source of electrical energy connected to said wave forming means and to said segments through said current modulating elements to energize said wave forming means only during the intervals when said contact element is in contact with said segments, a plurality of reflectors occupying arcs of circles concentric with said commutator, said arcs subtending and being coextensive with said segments and means for converting electromagnetic waves into electric current located at the foci of said reflectors.

12. An electrical energy transmission apparatus consisting of a stationary, circular horizontal commutator provided with a plurality of arcuate contact segments, rotatable means, including a contact element in cooperative relation with said commutator for forming and circularly rotating a radial beam of electromagnetic waves, said contact element making successive contact with said segments and thus energizing said beam forming means, a source of electric energy connected to said wave forming means and to said segments to energize said wave forming means only during the intervals when said contact element is in contact with said segments, a plurality of reflectors occupying arcs of circles concentric with said commutator, said arcs subtending and being coextensive with said segments, means for converting electromagnetic waves into electric current located at the foci of said reflectors and means connected to and operated by said segments and said contact element for energizing said source of power only during the intervals when said contact element is in engagement with said segments.

ALOYSIUS J. CAWLEY.